United States Patent [19]

Sato et al.

[11] Patent Number: 4,714,667
[45] Date of Patent: Dec. 22, 1987

[54] OPTICAL INFORMATION RECORDING MEDIUM

[75] Inventors: Tsutomu Sato; Masaakira Umehara; Michiharu Abe; Hideaki Oba; Yutaka Ueda, all of Yokohama, Japan

[73] Assignee: Ricoh Co., Ltd., Tokyo, Japan

[21] Appl. No.: 808,413

[22] Filed: Dec. 12, 1985

[30] Foreign Application Priority Data

Dec. 18, 1984 [JP] Japan .................. 59-265247

[51] Int. Cl.$^4$ ............................... G03C 1/72
[52] U.S. Cl. .................... 430/270; 430/945; 430/495; 430/21
[58] Field of Search ........... 430/945, 270, 495, 582, 430/584, 21; 346/125.1

[56] References Cited

U.S. PATENT DOCUMENTS 4,460,665  7/1984  Kunikane et al. .......... 430/945
4,508,811  4/1985  Gravesteijn et al. ........ 430/945

FOREIGN PATENT DOCUMENTS 58-125246  7/1983  Japan.
58-217391  12/1983  Japan.

Primary Examiner—Won H. Louie
Attorney, Agent, or Firm—Flynn, Thiel, Boutell & Tanis

[57] ABSTRACT

The present invention relates to an optical information recording medium comprising a recording layer applied directly on a substrate or applied on a substrate by intervening an underlayer therebetween, and further comprising a protective layer on said recording layer if necessary, characterized in that said recording layer contains at least one of the compounds expressed by the following general formula (I) or (II):

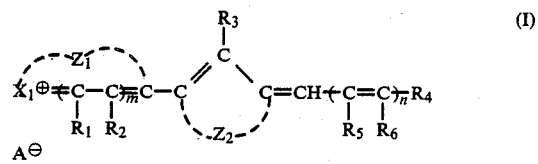

(I)

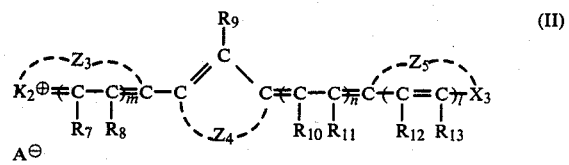

(II)

(wherein in the above formulas, $X_1$ to $X_3$ represent O, S or Se; $A^-$ represents an anion; l, m or n represents 0 or 1; $R_4$ represents a substituted or non-substituted aryl group or heterocyclic group; $R_3$, $R_5$, $R_6$, $R_9$, $R_{10}$ and $R_{11}$ represent hydrogen or an alkyl group; $R_1$, $R_2$, $R_7$, $R_8$, $R_{12}$, and $R_{13}$ represent hydrogen or a substituted or non-substituted alkyl, aryl or styryl group; $Z_1$, $Z_3$ and $Z_5$ represent atomic groups necessary for forming a substituted or non-substituted pyrylium, thiapyrylium, selenapyrylium, benzopyrylium, benzothiapyrylium, benzoselenapyrylium, naphthopyrylium, naphthothiapyrylium or naphthoselenapyrylium; $Z_2$ and $Z_4$ represent atomic groups necessary for forming a substituted or non-substituted five-membered ring or six-membered ring; and said five-membered ring and six-membered ring may be condensed with an aromatic ring).

9 Claims, 4 Drawing Figures

OPTICAL INFORMATION RECORDING MEDIUM

BACKGROUND OF THE INVENTION (a) Field of the Invention

The present invention relates to an optical information recording medium suitable for writing and recording with laser light.

(b) Description of the Prior Art

Heretofore, there is known an optical information recording and regenerating apparatus conducting recording and regenerating by irradiating a rotating disc-like optical information recording medium with laser light. It has been proposed to use a low-melting metal, or a combination of low-melting metal with dielectric material for a recording layer of this type of information recording apparatus. However, these materials have various disadvantages such as poor preservability, low resolving power, low recording density, high manufacturing cost due to hard manufacturing conditions, and the like.

Recently, it has been proposed to use an organic coloring matter thin film for a recording layer, the physical and chemical properties of which are changeable by light of a relatively long wavelength. This organic coloring matter thin film is free from the above mentioned faults, but an organic coloring matter having absorption properties in the long wavelength zone is generally unstable to heat and light.

SUMMARY OF THE INVENTION

The present invention was conceived in order to remove the above mentioned problems of the prior art, and an object of the present invention is to provide an optical information recording medium containing an organic thin film which is excellent in preservation stability and is not degraded even after being repeatedly regenerated.

That is, an object of the present invention is to provide an optical information recording medium comprising a recording layer applied directly on a substrate or applied on a substrate with an intervening underlayer therebetween, and further comprising a protective layer on said recording layer if necessary, characterized in that said recording layer contains at least one of the compounds expressed by the following general formula (I) or (II):

(wherein in the above formulas, $X_1$ to $X_3$ represent O, S or Se; $A^-$ represents an anion; l, m or n represents 0 or 1; $R_4$ represents a substituted or non-substituted aryl group or heterocyclic group; $R_3$, $R_5$, $R_6$, $R_9$, $R_{10}$ and $R_{11}$ represent hydrogen or an alkyl group; $R_1$, $R_2$, $R_7$, $R_8$, $R_{12}$, and $R_{13}$ represent hydrogen or a substituted or non-substituted alkyl, aryl or styryl group; $Z_1$, $Z_3$ and $Z_5$ represent atomic groups necessary for forming a substituted or non-substituted pyrylium, thiapyrylium, selenapyrylium, benzopyrylium, benzothiapyrylium, benzoselenapyrylium, naphthopyrylium, naphthothiapyrylium or naphthoselenapyrylium; $Z_2$ and $Z_4$ represent atomic groups necessary for forming a substituted or non-substituted five-membered ring or six-membered ring; and said five-membered ring and six-membered ring may be condensed with an aromatic ring).

DETAILED DESCRIPTION OF THE INVENTION

The present invention resides in that the recording layer of the optical information recording medium contains at least one of compounds of the following general formulas (I) and/or (II):

(wherein in the above formulas, $X_1$ to $X_3$ represent O, S or Se; $A^-$ represents an anion; l, m or n represents 0 or 1; $R_4$ represents a substituted or non-substituted aryl group or heterocyclic group; $R_3$ and $R_9$ represent hydrogen, alkyl, chloro or bromo, $R_5$, $R_6$, $R_{10}$ and $R_{11}$ represent hydrogen or an alkyl group; $R_1$, $R_2$, $R_7$, $R_8$, $R_{12}$, and $R_{13}$ represent hydrogen or a substituted or non-substituted alkyl, aryl or styryl group; $Z_1$, $Z_3$ and $Z_5$ represent atomic groups necessary for forming a substituted or non-substituted pyrylium, thiapyrylium, selenapyrylium, benzopyrylium, benzothiapyrylium, benzoselenapyrylium, naphthopyrylium, naphthothiapyrylium or naphthoselenapyrylium; $Z_2$ and $Z_4$ represent atomic groups necessary for forming a substituted or non-substituted five-membered ring or six-membered ring; and, if desired, said five-membered ring and six-membered ring may be condensed with an aromatic ring).

The optical information recording medium of the present invention is basically composed of a substrate and a recording layer, but if necessary, it may be further provided with an underlayer between the substrate and the recording layer, and/or with a protective layer on the recording layer. The optical information recording medium of the present invention may be formed into a sandwich-like structure by using a pair of recording mediums of the above mentioned structure.

According to the present invention, some optical change is caused on a recording layer by being irradi- ated with laser light, and information is recorded on the basis of this optical change. It is necessary to incorporate the above mentioned compounds of the general formulas (I) and/or (II) as the main component in the recording layer.

Typical examples of the compounds of the present invention as expressed by the general formulas (I) or (II) are listed below, but are not limited thereto.

1.

2.

3.

4.

5.

6.

7.

8.

9.

10.

11.

12.

13.

14.

15.

16.

17.

18.

19.

20.

21.

22.

23.

24.

25.

26.

27. ClO₄⁻

28. ClO₄⁻

29. ClO₄⁻

30. CH₃SO₄⁻

31. ClO₄⁻

32. ClO₄⁻

33. CH₃—⟨⟩—SO₃⁻

-continued

34.

35.

36.

37.

38.

39.

40.

In the preparation of the recording layer of the present invention, these compounds of the general formulas (I) and (II) are used alone or in a mixture of two or more for improving the recording properties and stability of the recording medium. If desired, the above compounds of the present invention may be used in the form of a mixture, dispersion or lamination with other dyes such as phthalocyanine type dye, tetrahydrocholine type dye, dioxazine type dye, triphenothiazine type dye, phenanthrene type dye, cyanine (merocyanine) type dye, anthraquinone (indanthrene) type dye, xanthene type dye, triphenylmethane type dye, croconium type dye, pyrylium type dye, azulene type dye and the like or other metals and metal compounds such as In, Sn, Te, Bi, Al, Se, TeO$_2$, SnO, As, Cd and the like. The recording layer of the present invention may further contain stabilizer, dispersing agent, fire retardant, lubricant, antistatic agent, surface active agent, plasticizer, and the like. The compounds of the above general formulas of the present invention may be mixed with or dispersed in high molecular compounds such as ionomer resin, polyamide type resin, vinyl type resin, natural high molecular compound, silicone, liquid rubber, and the like.

The formation of the recording layer can be carried out by various coating methods such as vapor-deposition, CVD, sputtering, solution coating, and the like. Particularly, a solution coating is preferable, the examples of which include dip coating, spray coating, spinner coating, blade coating, roller coating, curtain coating and the like. Any solvent can be used for this purpose, provided that it dissolves the compound of the above general formula of this invention, but it is preferable to use a solvent having a high dissolving power in order to obtain a film having a good uniformity and a high reflectance. Examples of the solvent used generally include alcohols such as methanol, ethanol, isopropanol and the like; ketones such as acetone, methylethylketone, cyclohexanone and the like; amides such as N,N-dimethylformamide, N,N-dimethylacetoamide and the like; sulfoxides such as dimethylsulfoxide and the like; ethers such as tetrahydrofuran, dioxane, ethyleneglycol monomethylether and the like; esters such as methylacetate, ethylacetate and the like; halogenated aliphatic hydrocarbons such as chloroform, methylene chloride, dichloroethane, carbon tetrachloride, trichloroethane and the like; and aromatics such as benzene, toluene, xylene, ligroin, monochlorobenzene, dichlorobenzene and the like.

The thickness of the recording layer of the present invention is determined preferably in such a manner as to make a light reflectance at least 15% in the wavelength of a regeneration laser light. That is, the recording layer generally has a thickness of 100 Å–10 μm, preferably 200 Å–2 μm.

A substrate used in the present invention should be transparent to laser light when writing and recording are carried out from the substrate side, but need not be transparent to laser light when they are carried out from the recording layer side. Examples of the substrate include glass; plastics such as polyester, polyamide, polyolefine, polycarbonate, epoxy, polyimide, polymethyl methacrylate, and the like; metals; ceramics; and the like.

The constitution of the optical information recording medium of the present invention is further illustrated in accordance with the accompanying drawings.

Figure 1:
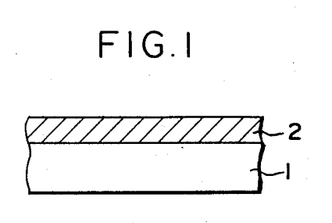
FIGS. 1 to 4 are sectional views illustrating a structure of the optional information recording medium of the present invention.

As can be seen from FIG. 1, the optical information recording medium of the present invention basically comprises a recording layer 2 containing at least one of the compounds having the general formulas (I) or (II) of the present invention applied on a substrate 1.

Figure 2:
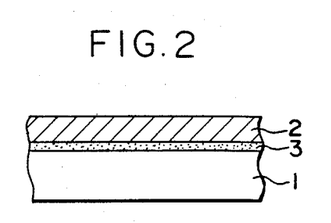
Figure 3:
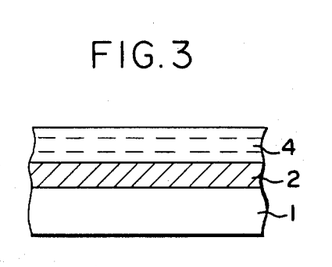
Figure 4:
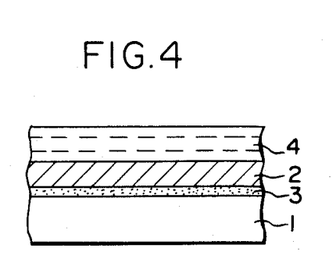

The basic structure of the optical information recording medium of the present invention as shown in FIG. 1 may be modified by further providing an underlayer 3 and/or a protective layer 4 as shown in FIGS. 2 to 4.

The underlayer is used for the purposes of (a) improving adhesion, (b) using as a barrier for water, gas, and the like, (c) improving preservation stability of the recording layer, (d) improving reflectance, (e) protecting a substrate from solvent, and (f) forming a pregroove, and the like. For the purpose of (a), various materials can be used, for example, high molecular compounds such as ionomer resin, polyamide type resin, vinyl type resin, natural high molecular compound, silicone, liquid rubber, and silane coupling agent and the like. For the purposes of (b) and (c), in addition to said high molecular compounds, various inorganic compound can be used, for example, SiO$_2$, MgF$_2$, SiO, TiO$_2$, ZnO, TiN, SiN, and the like, metallic or semi-metallic compounds such as Zn, Cu, S, Ni, Cr, Ge, Se, Cd, Ag, Al and the like. For the purpose of (d), metals such as Al, Ag and the like or an organic thin film having a metallic gloss such as methine type dye, xanthene type dye and the like can be used. For the purposes of (e) and (f), ultraviolet ray-curable resin, thermosetting resin, thermoplastic resin and the like can be used.

The underlayer has a thickness of 0.1–30 μm, preferably 0.2–10 μm.

A protective layer is provided for the purposes of protecting a recording layer from damages, dusts, dirts and the like and of improving the preservation stability and the reflectance of the recording layer. The same materials as those of said underlayer can be used for a protective layer. A protective layer generally has a film thickness of at least 0.1 μm, preferably at least 50 μm.

The underlayer and/or the protective layer may contain the compound of the present invention of the above general formulas (I) and/or (II). The underlayer or the protective layer may also contain a stabilizer, dispersing agent, fire retardant, lubricant, antistatic agent, surface active agent, plasticizer, and the like.

Another structure of the optical information recording medium may comprise two recording mediums of the same structure (one of which may be a substrate only) as shown in FIGS. 1 to 4. This is a so called "air sandwich structure" having the recording layers 2 sealed in the inside or "closely adhered sandwich structure" (laminated structure) having the recording layers 2 sealed in the inside with a protective layer 4 intervened therebetween.

An optical information recording apparatus can be made smaller when a semi-conductor laser having a wavelength of 750–850 nm is used as a laser light source.

The present invention is further illustrated by the following Examples and Comparative Examples, but is not limited thereto.

EXAMPLE 1

A solution prepared by dissolving the above listed compound No. 5 in 1,2-dichloroethane was spin-coated on a polymethylmethacrylate substrate ("Acrylite AR" manufactured by Mitsubishi Rayon Co., Ltd.) having a thickness of 1.2 mm to form a recording layer of having a thickness of 0.7 μm.

EXAMPLE 2

A recording medium was prepared in the same manner as in Example 1, except that the above listed compound No. 12 was used in place of the compound used in Example 1.

EXAMPLE 3

A recording medium was prepared by further applying a silver vapor-deposition film of 100 Å on the recording layer as prepared in Example 1.

EXAMPLE 4

A recording medium was prepared by vacuum vapor-depositing the above listed compound No. 24 on the above mentioned polymethylmethacrylate substrate of a thickness of 1.2 mm to form a recording layer having a thickness of 0.6 μm.

EXAMPLE 5

A solution prepared by dissolving a 1:1 weight ratio mixture of the above listed compound No. 30 and the coloring matter having the following chemical formula in 1,2-dichloroethane was spin-coated on a polymethylmethacrylate substrate ("Acrylite AR" manufactured by Mitsubishi Rayon Co., Ltd.) having a thickness of 1.2 mm to form a recording layer having a thickness of 0.7 μm.

EXAMPLE 6

A solution prepared by dissolving a 7:3 weight ratio mixture of the above listed compounds No. 7 and No. 27 in 1,2-dichloroethane was spin-coated on a polymethylmethacrylate substrate ("Acrylite AR" manufactured by Mitsubishi Rayon Co., Ltd.) having a thickness of 1.2 mm to form a recording layer having a thickness of 0.5 μm, and the coloring matter having the following chemical formula was further applied on the above formed recording layer by vacuum vapor-depositing the coloring matter thereon to a thickness of 0.15 μm, thus producing a recording medium.

EXAMPLE 7

A Te vapor-deposition film of 150 Å was provided on a polymethyl methacrylate substrate having a thickness of 1.2 mm, and a 1,2-dichloroethane solution of the above listed compound No. 5 was spin-coated on the above Te vapor-deposited substrate to form a recording layer having a thickness of 0.4 μm, thus producing a recording medium.

Information was recorded and regenerated on each recording medium prepared in the above Examples from the substrate side by a semi-conductor laser light having a wavelength of 790 nm at a recording frequency of 0.5 MHz and a linear velocity of 1.5 m/sec, and the regenerated wave was subjected to spectral analysis (scanning filter, band width = 30 KHz) to measure a C/N value.

As a preservation test, the same recording medium was allowed to stand for 1000 hours under the conditions of 60° C. and a relative humidity of 90%, and C/N values were then measured.

The test results are shown in the following table.

|  | Initial Value C/N value (dB) | After Preservation Test C/N value (dB) |
|---|---|---|
| Example 1 | 54 | 51 |
| Example 2 | 53 | 51 |
| Example 3 | 47 | 45 |
| Example 4 | 52 | 51 |
| Example 5 | 54 | 50 |
| Example 6 | 52 | 47 |
| Example 7 | 46 | 39 |

EXAMPLES 8 TO 12

Recording mediums were prepared in the same manner as in Example 1, except that the compounds as listed in the following table were used.

The test results are summarized in the following table.

|  | The above listed compound Nos. | Initial Value C/N value (dB) | After Preservation C/N value (dB) |
|---|---|---|---|
| Example 8 | No. 2 | 53 | 49 |
| Example 9 | No. 8 | 54 | 52 |
| Example 10 | No. 19 | 50 | 46 |
| Example 11 | No. 29 | 48 | 46 |
| Example 12 | No. 38 | 50 | 48 |

The optical information recording medium of the present invention having the above mentioned constitution achieves the following effects.

(a) The recording can be effected at a high sensitivity even by using a long wavelength laser (semi-conductor laser).

(b) A pit can be formed in a satisfactory shape and a high C/N value can be obtained.

(c) The stabilities to light and heat are high and the preservability is high. The performance is not degraded even after repeatedly regenerated.

What we claim is:

1. An optical information recording medium comprising a substrate and a recording layer on said substrate, said recording layer comprising at least one compound having the formula (I) or (II):

-continued (II)

wherein $X_1$, $X_2$ and $X_3$ represent O, S or Se; $A^-$ represents an anion; l, m and n represent 0 or 1; $R_4$ represents a substituted or non-substituted aryl group or heterocyclic group; $R_3$ and $R_9$ represent hydrogen, alkyl, chloro or bromo, $R_5$, $R_6$, $R_{10}$ and $R_{11}$ represent hydrogen or an alkyl group; $R_1$, $R_2$, $R_7$, $R_8$, $R_{12}$ and $R_{13}$ represent hydrogen or a substituted or non-substituted alkyl, aryl or styryl group; $Z_1$, $Z_3$ and $Z_5$ represent atomic groups necessary for forming a substituted or non-substituted pyrylium, thiapyrylium, selenapyrylium, benzopyrylium, benzothiapyrylium, benzoselenapyrylium, naphthopyrylium, naphthothiapyrylium or naphthoselenapyrylium; $Z_2$ and $Z_4$ represent atomic groups necessary for forming a substituted or non-substituted five-membered carbocylic ring or six-membered carbocylic ring; and said five-membered ring and six-membered ring may be condensed with an aromatic ring said recording information medium being adapted to have information recorded thereon by irradiating said recording medium with laser light to cause an optical change in the form of spaced-apart pits in said recording layer and being adapted to regenerating such information by laser light

2. The optical information recording medium as claimed in claim 1, wherein the compound of the general formula (I) or (II) contained in said recording layer is selected from the group consisting of:

1.

2.

3.

4.

5.

-continued

6.

7.

8.

9.

10.

11.

12.

13.

14.

15.

16.

17.

18.

19.

20.

21.

22.

23.

24.

-continued

25.

26.

27.

28.

29.

30.

31.

-continued

32.

33.

34.

35.

36.

37.

38.

39.

40.

3. An optical information recording medium as claimed in claim 1 in which said compound has the formula (I), n is 1, and $R_5$ and $R_6$ are hydrogen.

4. An optical information recording medium as claimed in claim 3 in which $Z_2$ represents atomic groups forming a substituted or non-substituted five-membered carbocylic ring.

5. An optical information recording medium as claimed in claim 3 in which $R_4$ is phenyl, phenyl substituted with methoxy, dimethylamino, 4,5-dimethoxy, methyl or chloro, carbazolyl or naphthyl.

6. An optical information recording medium as claimed in claim 3 in which $Z_2$ represents atomic groups forming a substituted or non-substituted six-membered carbocyclic ring.

7. An optical information recording medium as claimed in claim 1 in which said compound has the formula II, and n is 0.

8. An optical information recording medium as claimed in claim 7 in which $Z_4$ represents atomic groups forming a substituted or non-substituted five-membered carbocyclic ring.

9. An optical information recording medium as claimed in claim 7 in which $Z_4$ represents atomic groups forming a substituted or non-substituted six-membered carbocyclic ring.

* * * * *